Patented Sept. 6, 1949

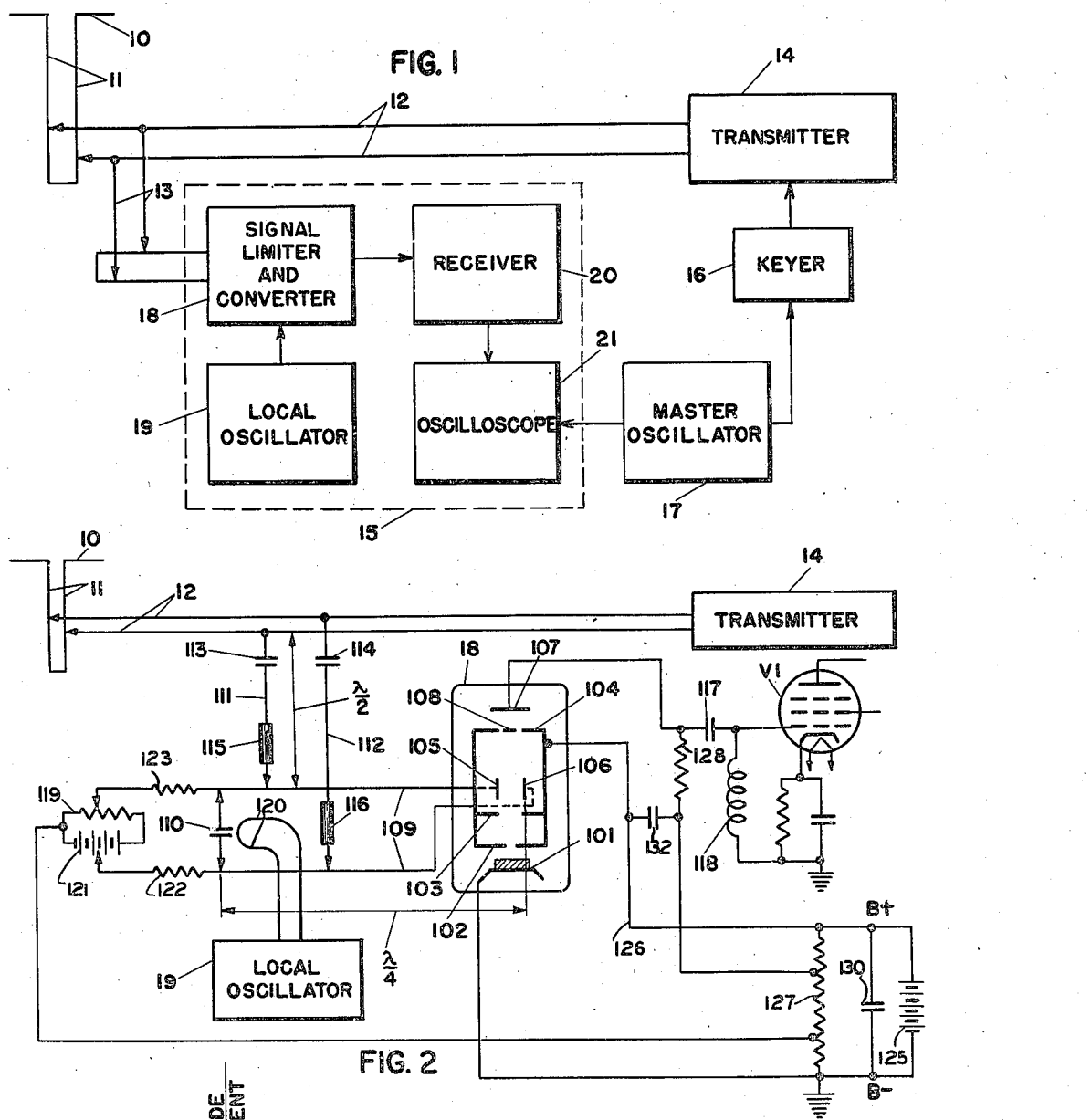
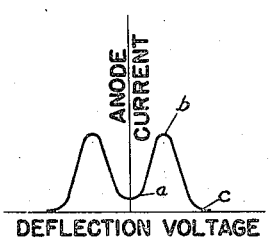
FIG. 3

2,480,872

UNITED STATES PATENT OFFICE 2,480,872

BEAM TUBE RECEIVER INPUT

James R. Moore, Rumson, N. J., assignor to the United States of America as represented by the Secretary of War Application November 28, 1942, Serial No. 467,270

3 Claims. (Cl. 250—13)

(Granted under the act of March 3, 1883, as amended April 30, 1928; 370 O. G. 757)

The invention described herein may be manufactured and used by or for the Government for governmental purposes, without payment to me of any royalty thereon.

This invention relates to radio object locating systems and more particularly to means for protecting a receiver in such systems during transmitting cycles, the receiver and transmitter being connected to a common antenna.

In the systems of this kind, powerful pulses of ultra high frequency energy are transmitted and radiated by a directional antenna array. If this energy impinges upon an object capable of reradiating a radio wave, a portion of this transmitted energy is reradiated, and a small part of this reradiated energy, or "echo," reaches the same antenna array. It is then impressed on a suitable receiver which detects this echo signal and produces a visual indication on a screen of an oscilloscope.

In order to obtain long range with the radar systems, it becomes necessary to mount the antenna arrays on steel towers as high as practicable. Moreover, to obtain a highly directive beam of sufficiently high intensity when transmitting and sufficiently directive receiving antenna when receiving, the number of dipole units is increased. This results in an antenna array of a relatively large size, especially when the radio frequency used is in the order of 100 megacycles. With these mechanical limitations imposed upon the system, the use of a plurality of independent antenna arrays for sending and receiving becomes very undesirable. This is equally true of K or X-band radar using a single dipole and a hyperbole reflector. Therefore, it is customary to use a single antenna for transmitting and receiving of signals.

The use of a single antenna, however, requires protection of receiver from a high intensity signal impressed on a common transmission line during transmitting cycle. If no special means are provided to isolate a sensitive receiver from the antenna circuit during transmitting cycle, the receiver may be destroyed by high power transmitted signal.

Certain known methods of protecting radar receivers involve the use of protective spark gaps connected across the transmission line leading to the input circuit of the receiver. In some instances the spark gap arrangement is replaced with diode elements which perform the same protective function.

The spark gap element ordinarily consists of two metal electrodes mounted in a glass envelope filled with an inert gas, such as argon, or the like, which is interposed across a transmission line connecting the receiver to antenna. If the transmission line represents a part of a tuned circuit, the transmitted signal forms a standing wave on the line. Since the spark gap element is connected at that part of the line where the transmitting voltage forms a loop, this voltage produces a discharge in the gas tube, thereby protecting the receiver.

This mode of protecting the receiver is not free of certain disadvantages notable of which are dissipation of power at the time of transmission through discharge, and inability to tune properly the transmitter-receiver system. The transmitter channel cannot be kept critically tuned because the discharge across the tube changes the impedance of this channel and detunes it. If the elements of the transmission channel are so placed that the transmission channel approaches perfect tuning at the time of discharge across the spark gaps, then the same channel becomes detuned at the time of the reception of the echo signals. It is customary, therefore, to operate these systems so that they are partially tuned for transmission as well as reception of signals. This mode of operation obviously limits efficiency of such system.

The above difficulty may be minimized by following the teachings of my objection. According to the invention a special cathode ray beam tube is used in such a manner as to act as a converter as well as an effective protector of receiver when the signals from transmitter are impressed on the receiver channel.

It is, therefore, an object of my invention to provide an improved form of protective circuit for a receiver connected to the same antenna as the transmitter.

A further object of my invention is to combine in a single element an improved form of a protective circuit with an improved form of an electron beam device particularly useful for frequency conversion in superheterodyne reception.

Another object of my invention is to provide an improved form of protective system which enables more accurate tuning of transmitting and receiving channels with the resulting higher efficiencies during transmitting and receiving cycles.

The novel features which I believe to be characteristic of my invention are set forth with particularity in the appended claims, but the invention itself will best be understood by reference to the following description taken in connection with the accompanying drawings in which:

Fig. 1 illustrates a block diagram of a pulse echo radio system with my signal limiter connected in the receiver channel;

Fig. 2 illustrates a schematic diagram of the protective signal limiter; and

Fig. 3 illustrates an anode current curve of the signal limiter.

Referring to Fig. 1, a common antenna 10 is connected to a transmitter 14 and a receiver 15 by transmission lines 11, 12, and 13. Transmitter 14 is keyed by a keyer 16, this keyer being connected to a master oscillator 17. Receiver 15 comprises a signal limiter and converter 18 connected to transmission line 13, a local oscillator 19, the intermediate and audio frequency stages of receiver 20, the output of which is connected to an oscilloscope 21 whose sweep circuit is controlled by master oscillator 17.

The operation of the pulse echo system illustrated in Fig. 1, is as follows: Keyer 16 modifies the sinusoidal wave impressed upon it by master oscillator 17 into a periodic series of peaked pulses of short duration. These pulses are utilized for generating equally short pulses by transmitter 14, which are in turn radiated by a highly directional antenna 10. If there are any echoes they are received by the same antenna during the idle periods of transmitter 14. The echoes as well as the transmitter pulses are impressed on the signal limiter and converter 18 where they are combined with the frequency of local oscillator 19 and converted into pulses of intermediate frequency. The I. F. pulses are impressed on receiver 20, which converts them into video pulses and impresses the latter on the deflection plates of oscilloscope 21 whose sweep circuit is under control of master oscillator 17. The visual indications produced on the oscilloscope are utilized for determining the location of the object producing the echoes.

Since my invention resides in protecting receiver 20 by means of the signal limiter and converter 18, the schematic diagram of the latter is illustrated in Fig. 2. Referring to Fig. 2, antenna 10, transmission lines 11 and 12, and transmitter 14, illustrated in Fig. 1, are also illustrated in Fig. 2. The signal limiter and converter 18, illustrated in schematic form in this figure, comprises a beam tube described in the U. S. Patent to Edward W. Herold, No. 2,294,659, dated September 1, 1942, whose disclosure is hereby incorporated as a part of this specification.

This tube comprises a cathode 101, a plurality of accelerating and focusing electrodes 102, 103, and 104, deflection plates 105, 106, and an anode 107. In the center of an aperture in electrode 104, there is a rod 108 electrically connected to electrode 104. The operating characteristics of this tube are fully described in the above mentioned patent to Herold and need not be repeated here. The deflection plates 105—106 of this tube are connected to a quarter wave length, or odd number of quarter wave lengths, trombone 109 whose electrical length is adjusted at the points of contact of a condenser 110 with the conductors forming this trombone. The trombone 109 is connected to transmission line 12 through conductors 111—112 and condensers 113—114. The conductors 111—112, which correspond to line 13 illustrated in Fig. 1, are provided with adjustable links 115—116 which are so adjusted that the electrical length of the connection between trombone 109 and transmission line 12 is equal to a half-wave length or a multiple of it, the wave length being that of transmitter 14. Moreover, these conductors form a transmission line which is to be matched to the main transmission line as well as to the trombone.

Local oscillator 19 is inductively or capacitively coupled to trombone 109, an inductive coupling loop 120 being illustrated in the figure. The output of converter 18 is connected to an intermediate stage amplifier VI through a condenser 117 and a coil 118 whose inductance and distributed capacitance act as a tuned circuit for the intermediate frequency signal. A source of direct current potential 121 and a potentiometer 119 are used for adjusting the normal position of the beam so that it strikes rod 108 when there are no signals impressed on the converter, and the normal plate current is at a minimum. Source 121 and potentiometer 119 are connected to the deflection plates 106 and 105 respectively through high resistances 122 and 123 and two conductors constituting the u. h. f. transformer 109. By adjusting potentiometer 119 it is possible either to decrease or increase the voltage impressed on plate 105 as compared to the voltage impressed on plate 106 with the concomitant shifting of the electron beam toward the plate having higher positive voltage. The accelerating and focusing electrodes are connected to a source of potential 125 over a conductor 126. The same source furnishes positive potential for plate 107, which is connected to a voltage divider 127 through a plate resistor 128. The accelerating and focusing electrodes and rod 108 are all shunted to ground through a filter condenser 130 so that the u. h. f. signal does not appear in the voltage divider and source 125. A filtering condenser 132 is also connected across the upper portion of potentiometer 127 so that the u. h. f. signal appearing across resistance 128 is shunted to ground through the condensers 132 and 130.

The operation of the system is as follows: when transmitter 14 is transmitting, large power u. h. f. pulses are impressed on the electrically flat transmission line 12 and on the half-wave length link 111—112. The voltage of pulses is further amplified by quarter wave length trombone 109 which acts as a step-up transformer. Since the high voltage end of the transformer is connected, across the deflection plates 105—106, the electron the beam of converter 18 will be oscillated at the u. h. f. frequency of the transmitter modulated by oscillator 19, i. e. at intermediate frequency. Since the maximum deflection positions the beam will be deflected beyond the aperture openings in electrode 104, no space current will reach plate 107 and the signal impressed on tube VI at this instant will be equal to zero. One can very readily see that this is the case by referring to the deflection voltage-anode current curve for this tube illustrated in Fig. 3. At point "a" the beam is centered on rod 108, and the magnitude of the anode current depends upon the focusing of the beam, the width of rod 108, and the amount of stray electrons reaching anode 107. When the beam is deflected to the right in Fig. 3, the anode current reaches a maximum at point "b," which takes place when the beam reaches plate 107 through either aperture, and then decreases when part of the beam begins to strike electrode 104. When the entire beam is deflected toward electrode 104, the anode current is equal to zero, which corresponds to point "c" on the curve. The same is true when the beam is deflected to the left. The maximum cathode-anode current delivered by the converter is sufficiently low so as to prevent any injury of the receiver during sending cycle of transmitter 14. When an echo is received, it is impressed on trombone 109 in exactly the same manner as the transmitted signal, transformer log steps up the voltage, and since the echo signal is ordinarily very weak, converter 18 now acts as an ordinary full-wave converter, as described in the above mentioned patent to Herold.

Comparison of my system with the prior art discloses several important advantages. Converter 18 can be connected to the common transmission line 12 through the voltage-amplifying trombone 109 since the impedance across the deflection plates 105—106 is very high. This results in an amplification of the weak echo signals and a higher signal to noise ratio in the output of the receiver. Since the radio frequency of the echoes is the same as the radio frequency of the transmitted signal producing them, the transmitted signal will be also amplified by transformer 109. However, this high voltage transmitting pluse will not impair the receiver since during the transmitting cycle the beam tube acts not only as a converter but also as a limiter. These desirable transmitting-receiving operating characteristics are obtained without imposing undue shunting load on the main transmission line 12 during the transmitting cycle, which results in the delivery of high percentage of transmitter power to the antenna for transmitting high power exploratory pulse.

From the foregoing description of my invention it will be clear to those skilled in the art that there are numerous extensions and modifications within the scope thereof. Thus the invention should not be regarded as limited to the specific embodiment shown, but is rather defined by the scope of the appended claims.

I claim:

1. In a radio-pulse echo object locating system having a transmitter and a receiver connected to a common transmitting-receiving antenna, said receiver being connectible to said antenna through a constant intensity electron beam tube having beam deflecting means, two apertures in a grounded electrode above and below the normal position of said beam, and an anode in the electron-intercepting relationship with respect to said apertures, said anode being connected to said receiver, the method of protecting the receiver from overloading during the transmitting cycle which includes the steps of impressing an ultra-high frequency transmitting pulse on said antenna and on said means, generating four, spaced, unipolar pulses in response to each cycle of said ultra-high frequency at said anode by deflecting said beam beyond the boundary of one aperture at a positive half cycle of said frequency, and beyond the boundary of the other aperture at a negative half cycle of said frequency, and generating two, spaced, unipolar pulses at said anode in response to echoes of said pulse.

2. A radio system including an antenna, a transmitter and a receiver connected to said antenna, an electron beam tube in the input circuit of said receiver, said electron beam tube having beam deflecting means connected to said antenna and said transmitter, an accelerating and focussing electrode having two apertures, said electrode being grounded through a condenser, and an anode connected to said receiver and in beam-intercepting relationship with respect to said apertures, said deflecting means deflecting said beam in response to a pulse generated by said transmitter so as to ground said beam through said grounded electrode during the larger portion of said pulse, whereby only relatively weak pulses are generated by said beam in said anode, and impressed by said anode on said receiver, when said beam reaches said anode through said apertures.

3. In a radio pulse-echo system, a transmitting-receiving antenna, a transmitter, a transmission line interconnecting said transmitter and said antenna, a receiver, an electron beam tube at the input of said receiver, said tube having a cathode, electron eccelerating and focussing electrodes, apertures in said electrodes, an anode in electron-intercepting relationship with the apertures adjacent to said anode, deflection plates in said tube for oscillating said beam across the apertures adjacent to said anode, a connection between said anode and said receiver, a low impedance path between said electrodes and said cathode, and connnections between said transmission line and said deflection plates, said transmitter, when transmitting, oscillating said beam across said apertures and against said electrodes whereby said tube acts as a limiter during transmitting cycles of said system.

JAMES R. MOORE.

REFERENCES CITED

The following references are of record in the file of this patent:

UNITED STATES PATENTS

| Number | Name | Date |
| --- | --- | --- |
| 1,035,958 | Girardeau | Aug. 20, 1912 |
| 2,277,731 | Toth | Mar. 31, 1942 |
| 2,287,296 | Dallos | June 23, 1942 |

Certificate of Correction

Patent No. 2,480,872                        September 6, 1949

JAMES R. MOORE

It is hereby certified that errors appear in the printed specification of the above numbered patent requiring correction as follows:

Column 2, line 30, for the word "objection" read *invention*; column 3, line 39, for "producting" read *producing*; column 4, line 51, after "Since" insert *in*; column 6, line 31, for "eccelerating" read *accelerating*;

and that the said Letters Patent should be read with these corrections therein that the same may conform to the record of the case in the Patent Office.

Signed and sealed this 25th day of April, A. D. 1950.

[SEAL]

THOMAS F. MURPHY,
*Assistant Commissioner of Patents.*